(12) United States Patent
Zach et al.

(10) Patent No.: US 10,782,182 B2
(45) Date of Patent: Sep. 22, 2020

(54) POLYMERIC MEASURING PLATE OF A WEIGHING PLATFORM AND A METHOD OF MANUFACTURING A POLYMERIC MEASURING PLATE OF A WEIGHING PLATFORM

(71) Applicant: MEGATERM PLUS SPOLKA Z OGRANICZONA ODPOWIEDZIALNOSCIA, Kielce (PL)

(72) Inventors: Piotr Zach, Warsaw (PL); Marek Jach, Kielce (PL)

(73) Assignee: MEGATERM PLUS SPOLKA Z OGRANICZONA ODPOWIEDZIALNOSCIA, Kielce (PL)

( * ) Notice: Subject to any disclaimer, the term of this patent is extended or adjusted under 35 U.S.C. 154(b) by 249 days.

(21) Appl. No.: 15/772,724

(22) PCT Filed: Nov. 13, 2015

(86) PCT No.: PCT/PL2015/000186
§ 371 (c)(1),
(2) Date: May 1, 2018

(87) PCT Pub. No.: WO2017/078553
PCT Pub. Date: May 11, 2017

(65) Prior Publication Data
US 2018/0321078 A1 Nov. 8, 2018

(30) Foreign Application Priority Data
Nov. 4, 2015 (PL) .......................... 414679

(51) Int. Cl.
*G01G 21/22* (2006.01)
*G01G 21/23* (2006.01)
*G01G 21/28* (2006.01)

(52) U.S. Cl.
CPC ............. *G01G 21/22* (2013.01); *G01G 21/23* (2013.01); *G01G 21/28* (2013.01)

(58) Field of Classification Search
CPC ......... G01G 21/22; G01G 21/23; G01G 21/28
See application file for complete search history.

(56) References Cited

U.S. PATENT DOCUMENTS 4,177,868 A * 12/1979 Sanders ............... G01G 3/1406
177/211
4,679,643 A * 7/1987 Bove ........................ G01G 7/06
177/210 C (Continued)

FOREIGN PATENT DOCUMENTS

DE 3604419 A1 8/1987
DE 3604421 A1 8/1987

(Continued)

OTHER PUBLICATIONS

International Search Report and Written Opinion dated Jul. 7, 2016, from the corresponding International Application No. PCT/PL2015/000186, 11 sheets.

*Primary Examiner* — Randy W Gibson
(74) *Attorney, Agent, or Firm* — Katten Muchin Rosenman LLP (57) ABSTRACT

A polymeric measuring plate of a weighing platform comprising measurement systems is characterized in that the measuring plate is made in its entire volume of a polymeric thermoplastic material or polymeric duroplastic material, thermosetting or chemically curing, the shape of the plate is limited by a substantially flat active surface (1a) and a spatially shaped passive surface (1b), and the measuring (Continued)

systems are located in areas of highest stress and are in the form of optoelectronic measuring systems (7) or beam measuring systems (11). A method of manufacturing a polymeric measuring plate of a weighing platform, which plate is defined by claims 1 to 3, is characterized in that the shape of the passive surface (1*b*) of the polymeric measuring plate (1) and arrangement of measuring systems (7) or (11) is selected by means of computer software for specific working conditions of the weighing platform, and subsequently a polymeric measuring plate (1) is shaped by a method that is suitable for the polymer material used.

11 Claims, 8 Drawing Sheets

(56) References Cited

U.S. PATENT DOCUMENTS

| | | | | |
|---|---|---|---|---|
| 4,886,133 | A * | 12/1989 | Horn | G01G 3/1402 177/211 |
| 4,949,798 | A * | 8/1990 | Strasser | G01G 21/22 177/134 |
| 4,979,581 | A * | 12/1990 | Kroll | G01G 19/027 177/134 |
| 5,886,302 | A * | 3/1999 | Germanton | G01G 3/13 174/135 |
| 5,894,112 | A * | 4/1999 | Kroll | G01G 19/07 177/134 |
| 6,639,158 | B2 * | 10/2003 | Germanton | G01G 19/44 177/238 |
| 6,797,894 | B2 * | 9/2004 | Montagnino | G01G 21/22 177/238 |
| 7,339,123 | B2 * | 3/2008 | Yamashita | G01G 19/02 177/238 |
| 8,178,797 | B2 * | 5/2012 | Bayer | G01G 21/30 177/132 |
| 2004/0238236 | A1 * | 12/2004 | Linglin | G01G 3/1402 177/229 |
| 2006/0231299 | A1 * | 10/2006 | Tsuji | G01G 21/18 177/238 |
| 2008/0229847 | A1 * | 9/2008 | Harish | G01G 7/06 73/862.625 |
| 2010/0181120 | A1 * | 7/2010 | Lo | G01G 21/22 177/253 |
| 2011/0174086 | A1 * | 7/2011 | Harish | G01G 23/002 73/862.626 |

FOREIGN PATENT DOCUMENTS

| | | |
|---|---|---|
| RU | 2055453 C1 | 2/1996 |
| RU | 95101655 A | 4/1996 |

* cited by examiner

POLYMERIC MEASURING PLATE OF A WEIGHING PLATFORM AND A METHOD OF MANUFACTURING A POLYMERIC MEASURING PLATE OF A WEIGHING PLATFORM

The present invention relates to a polymeric measuring plate of a weighing platform and a method of manufacturing the same. The present solution is intended for use in weighing devices, in particular industrial ones, including bulky weighing devices.

In traditional weighing devices, measuring platforms are constructed of a measuring plate made of a material other than polymers or of a material with polymer addition to which metal measuring beams are connected. Mechanical tensometric elements are fixed to beam elements by bonding techniques, usually gluing.

Patent application DE3604419 discloses a structure of a platform scale with a load-bearing structure made of polymeric concrete wherein reinforcing elements in the form of rods and mats are used.

Patent application DE3604421 discloses a solution of a platform scale for weighing road vehicles wherein the structure of the weighbridge is made of load-bearing elements on which force measuring elements are arranged and the structure is filled with polymeric concrete.

Patent application RU95101655 discloses a solution of a weighing platform for standing and moving wheeled vehicles wherein a drive-on load-bearing element was made with the use of steel profiles and polymer fillings.

One disadvantage of the prior art solutions is high weight of weighing platforms and, primarily, low measurement accuracy.

The purpose of the present invention is to provide a polymeric measuring plate of a weighing platform whose geometry is adjusted to the measuring method and loading capacity, which ensures an accurate, repeatable and immutable in time measurement. Another purpose of the present invention is to provide a method of manufacturing a polymeric measuring plate of a weighing platform.

A polymeric measuring plate of a weighing platform comprising measuring systems according to the present invention is characterized in that the measuring plate is made in its entire volume of a thermoplastic polymer material or duroplastic polymer material, thermosetting or chemically curing, wherein the shape of the plate is limited by a substantially flat active surface and a spatially shaped passive surface, and measuring systems are located in the areas of highest stress and are in the form of opto electronic measuring systems or beam measuring systems with the use of tensometric beams or polymer measuring beams. Preferably, the spatially shaped passive surface of the polymer measuring panel is constituted by at least shaped profiles or ribs and channels. Preferably, the optoelectronic measuring systems are uniformly bonded with the polymer measuring plate of the weighing platform, and the beam measuring systems are located in technological sockets of the plate.

The method of manufacturing a polymer measuring plate of a weighing platform is characterized in that the shape of the passive surface of the polymeric measuring plate and arrangement of measuring systems is selected with by means of computer software for specific working conditions of the weighing platform, and subsequently a polymer measuring plate is shaped by a method that is suitable for the polymer material used, preferably by injection technology. In a variant with optoelectronic systems, optoelectronic measuring systems are bonded in a uniform manner with a layer of extreme fibers of the polymer measuring plate in a technological area defined by means of computer software in one operation, and when the shape has stabilized, the plate is taken out from the mould. In a variant of a plate wherein beam measuring elements are used, technological sockets are made in the plate wherein tensometric beams or polymer measuring beams are placed. A measuring plate provided with optoelectronic or beam measuring systems is connected by means of signal cables to an analyzer, and then the plate is calibrated and marked with an unfading code.

The solution according to the invention allows a long-lasting failure-free operation of both the polymer measuring plate as such and the weighing platform with such a plate. The plate ensures very accurate and stable in time measurement; it is light and easy to be made and thus eliminates disadvantages of the prior art solutions. The plate makes it possible to use modern measuring techniques. The use of a polymer material guarantees accurate, repeatable reproduction of the plate's shape designed by means of computer software, in particular the shape of the passive surface, which determines obtaining products of the same high quality. A weighing platform with such a plate is insensitive to the influence of external weather conditions and chemical factors (to the extent allowed by the properties of the polymeric material used) which may cause damage to the measuring system. The application of a polymeric material makes it possible to use the plate in environments with specific sanitary-epidemiological requirements, such as food-processing industry.

The solution according to the invention is presented in embodiments in the drawing in which.

Figure 1:
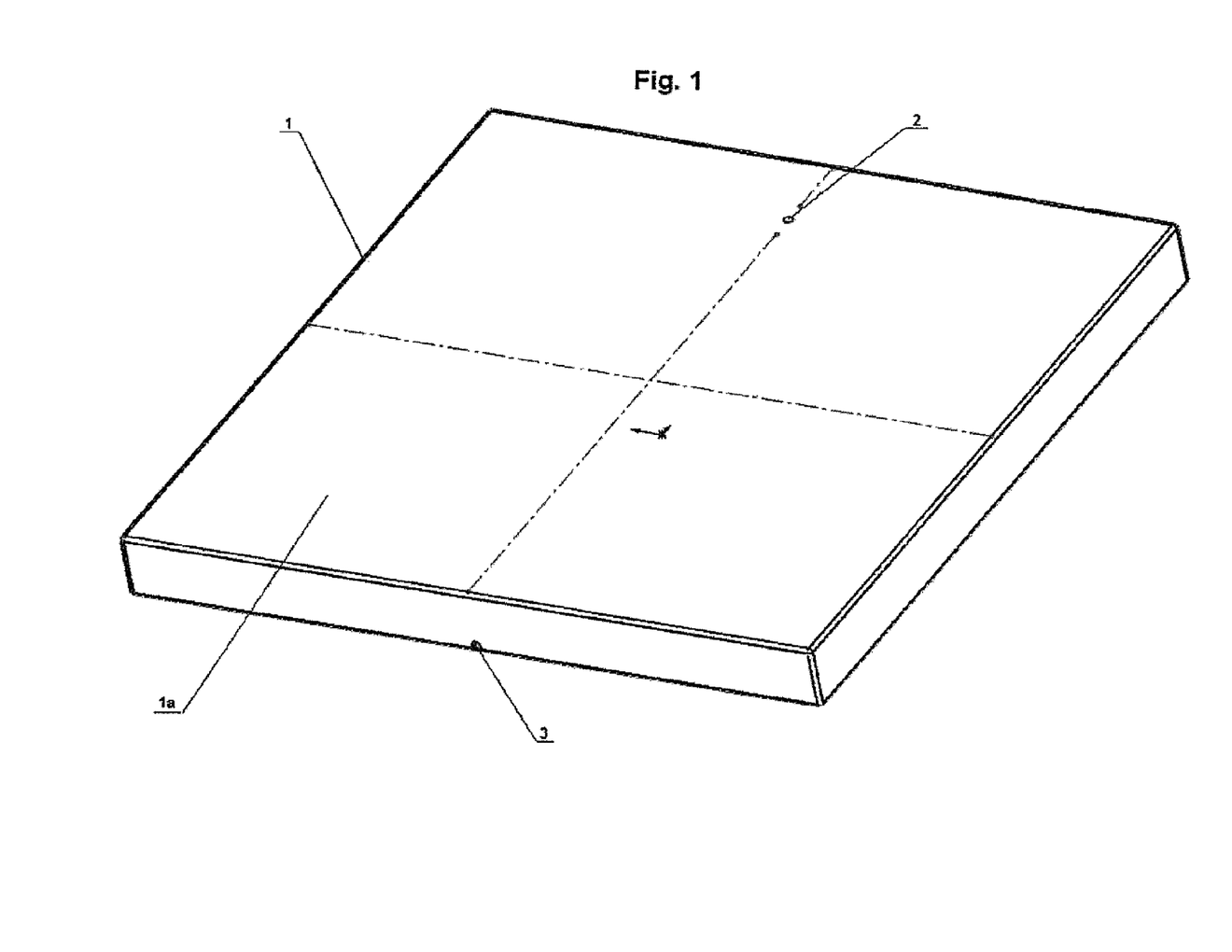
FIG. 1 shows a top spatial view of a polymeric measuring plate.
Figure 2:
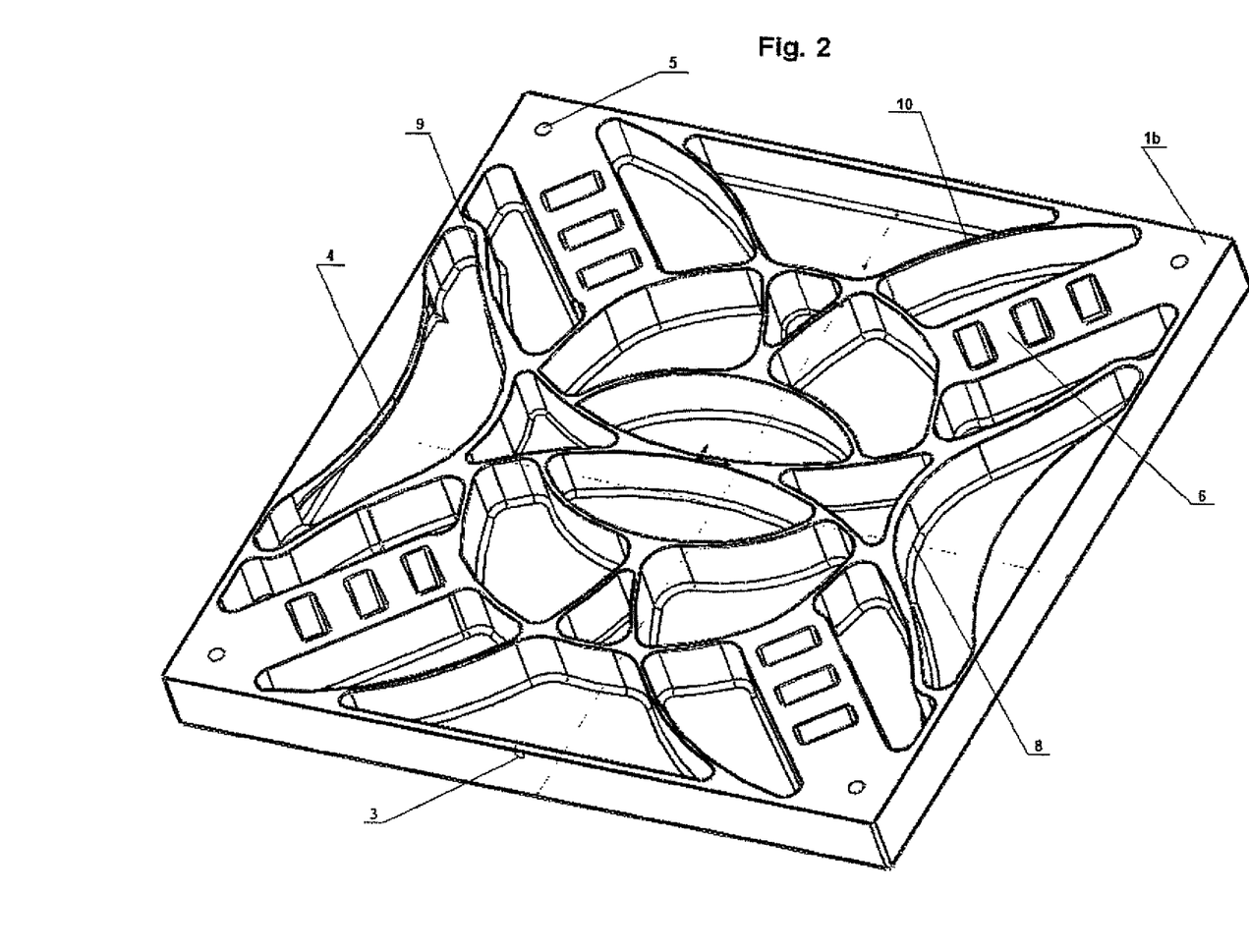
FIG. 2 shows a bottom spatial view of a polymeric measuring plate.
Figure 3:
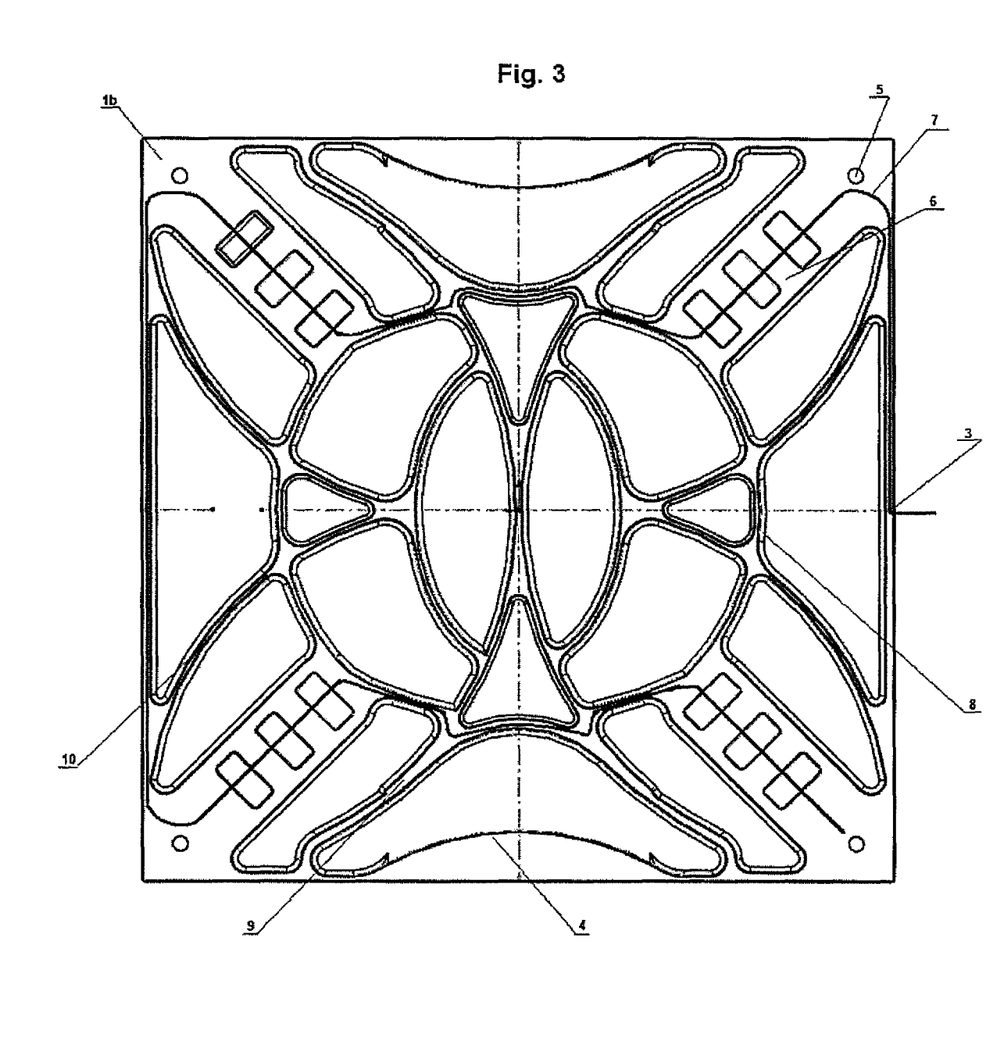
FIG. 3 shows a bottom view of a polymeric measuring plate, in a variant wherein an optoelectronic measuring system 7 is in the form of an optical fiber grid.
Figure 4:
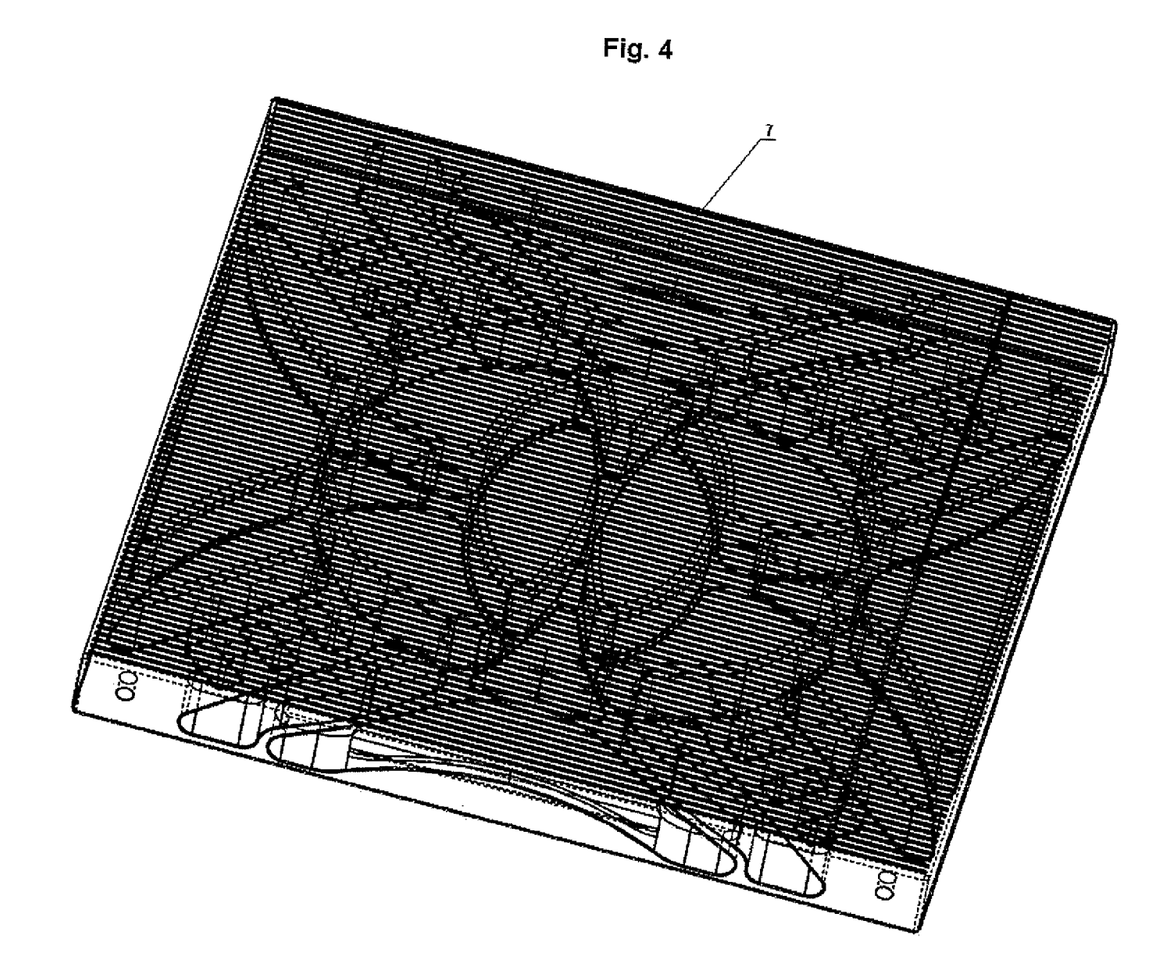
FIG. 4 shows a bottom panel of a polymeric measuring plate with an optoelectronic measuring system 7 in the form of a capacitive or inductive system located immediately under the surface the active surface of the plate.
Figure 5:
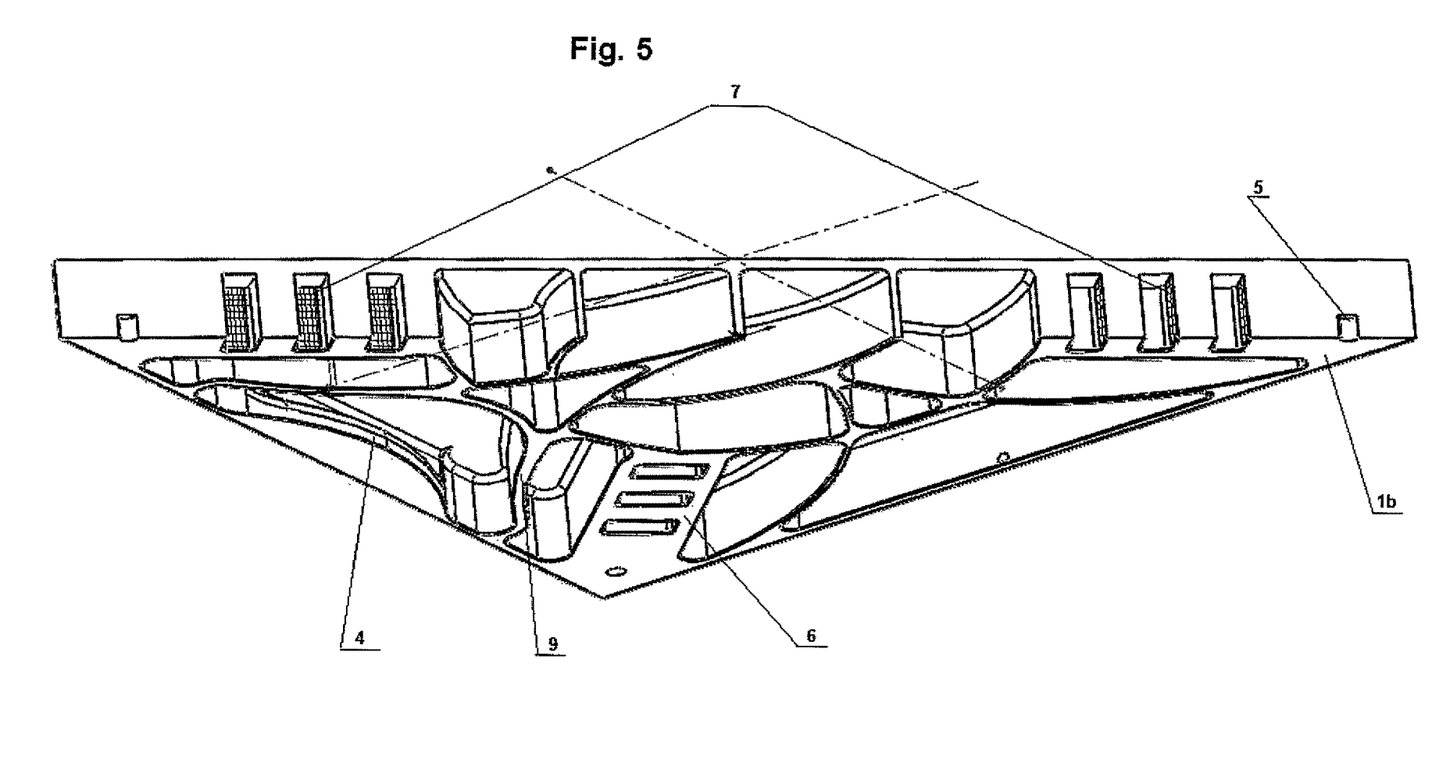
FIG. 5 shows a polymeric measuring plate with an optoelectronic measuring system 7 in the form of a laser, presented in a perspective view of half section along the plate's diagonal.

In the embodiment depicted in FIG. 1 to FIG. 8, a polymeric measuring plate 1 of a weighing platform is in the shape that is delimited by a flat rectangular prism with an active surface 1*a* of the plate 1 being substantially flat, for example, having flat texture, and a passive surface 1*b* being spatially shaped. The polymeric measuring plate 1 is made of polyacrylamide, but in other variants is may also be made of another polymeric material, selected to suit a specific type of the platform. On the active surface 1*a* of the polymeric measuring plate there is located a level 2 providing information on correct adjustment and setup of the plate, and in a constructional wall vertical to the active surface 1*a*, on the axis of symmetry of the level 2 there is located an inlet 3 far signal cables. On the bottom side of the polymeric measuring plate 1 there are profiled holders 4 for carrying the plate and sockets 5 for fitting mounting units of the plate. The morphology of the passive surface 1*b* provides a constructional solution of the shape, location and arrangement of technological measurement areas of the so-called stress concentrators 6 and precisely located optoelectronic measurement systems 7, shown in FIG. 3 to FIG. 5 or beam measurement systems 11, show in FIG. 6 and FIG. 7. In individual variants optoelectronic measurement systems 7 are in the form of optical fiber grid, as shown in FIG. 3, or an capacitive or inductive touch system located immediately under_the active surface 1a, as shown in FIG. 4, or a laser system in the form of a grid or bars, as shown in FIG. 5. The variant of a polymer measurement plate with beam measurement systems 11 may use tensometric measurement beams or polymeric measurement beams, and in this variant the polymer measurement plate 1 is provided with technological sockets 12 for mounting technological beams. Precisely designed shape and cross-section of shaped profiles 8, ribs 9 and channels 10 of the passive surface 1b constitute a spatially oriented structure providing rigidity of the plate, which determines correct and stable in time measurements.

The method of manufacturing a polymeric measuring plate consists in that an initial assessment of the level of deformation, stress and dislocation of characteristic points is made using a mathematical description suitable for the operation mode of the structure, which in consequence makes it possible to identify highly loaded areas.

Next, the surface is numerically divided into subareas by means of curvilinear shaped profiles with simultaneous assessment of the influence of the given type of stiffening on the operational mode of the entire structure, while taking into consideration that the stiffening elements should not cause local stress concentration. The use of curvilinear elements makes it possible to arbitrarily divide the working area into areas of an expected mode of operation, to shape the profile of the plate according to load gradients and to obtain an even distribution of stress over the entire cross-section of the examined structure.

In the case of a highly loaded polymer plate of high rigidity, such as industrial weighing scales, the first step involves calculating (with the use of the KIRCHHOFF-LOVE theory of plates) a theoretical thickness of an element, displacement for minimum loads and overload conditions for $\sigma \leq \sigma_R$ for the assumed external loads and defined boundary conditions (mounting method, load, given material).

Subsequently, a 3D solid numerical model of a plate is made for the calculated dimensions using a parametric system, as well as models of cooperating elements, such as deformable measurement elements, tensometric beams, polymeric measuring beams and support units.

For all elements affecting the operation of the main system, i.e. a tensometric beam, a polymeric measuring beam, a polymeric measuring plate of a weighing platform, a numerical image of the system's response to loads is made using the Finite Element Method (FEM).

Next, using a numerical system operating on the basis of, for instance, the Finite Element Method (FEM), an initial analysis of the platform (flat plate) deformation is carried out for defined boundary conditions, i.e. fixing method, mounting and load taking into consideration the mode of operation of the cooperating elements. The analysis makes it possible to describe stress distribution (draw stress maps), identify highly loaded areas, and calculate deformation of characteristic points.

Next, the model is processed by CAD system in order to prepare a spatially defined structure making it possible to combine the elements of measurement, reinforcement, stiffening, and mounting. The construction is designed based on the assumption that the stiffening elements used shall not cause local stress concentration. To this end the surface is numerically divided into subareas by means of curvilinear shaped profiles defined by stress change gradients. The influence of given type of stiffening on the mode of operation of the entire construction is assessed using, for example, FEM. The polymer composition mass and weight of the product are estimated.

Such a designed polymeric measuring plate 1 in a variant with an optoelectronic system 7 is produced and connected to the optoelectronic system 7 by injection technology in one operation. In the variant presented in FIG. 3, the optoelectronic system 7 uses an opto electronic element in the form of optical fibre grid located in a technological area defined by a computer system, whereas the shape of the polymeric measuring plate 1, type of polymeric material, and shape and size of increased deformability areas that act as stress concentrators 6 are selected using a computer system on the basis of particular conditions specific to given type of measurements. After stabilizing its shape, the polymeric measuring plate 1 is taken out of a mould and then signal cables are connected to an analyzer, which is a separate element not shown in the drawing, the polymeric measuring plate 1 is calibrated and marked with an unfading numerical code on the passive side 1b wherein such information as type of plate, type of measuring element, process parameters, serial number and date are encoded.

In the next variant depicted in FIG. 4, a capacitive or inductive touch system located immediately under the surface of the active surface 1a has been used as an element of the optoelectronic measuring system 7.

In the next variant shown in FIG. 5, a laser system in the form of a grid or a bar has been used as an element of the optoelectronic measuring system 7.

Figure 6:
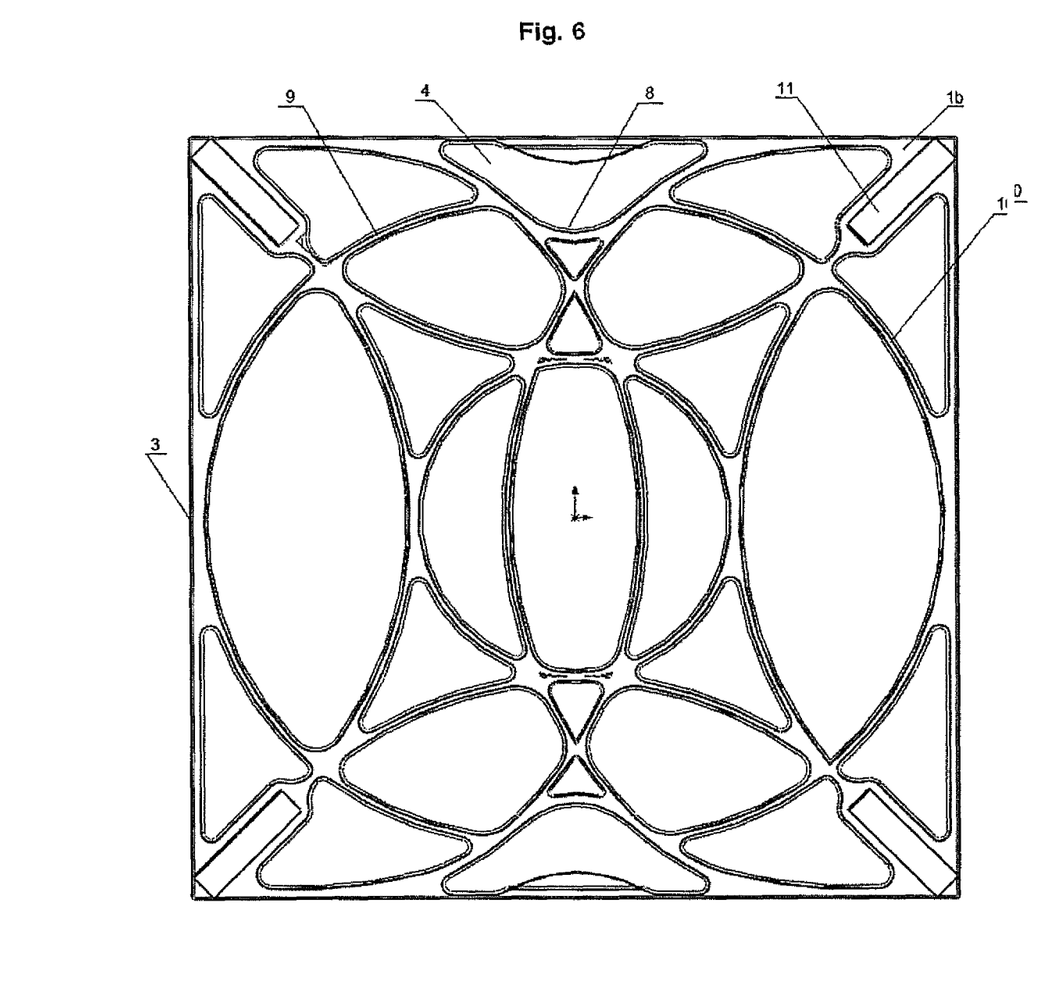
FIG. 6 shows a planar bottom view of a polymeric measuring plate with a measuring system in the form of measuring beams.
Figure 7:
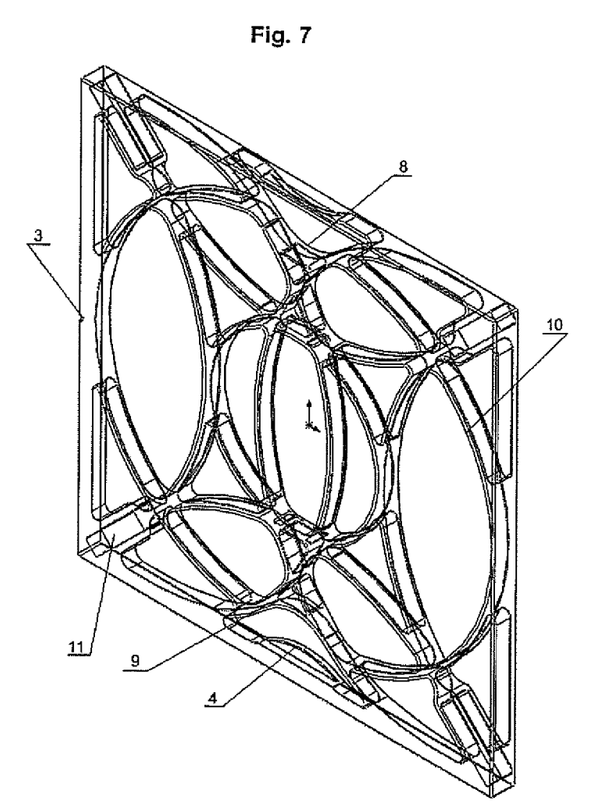
FIG. 7 shows a perspective bottom view of the same plate.
Figure 8:
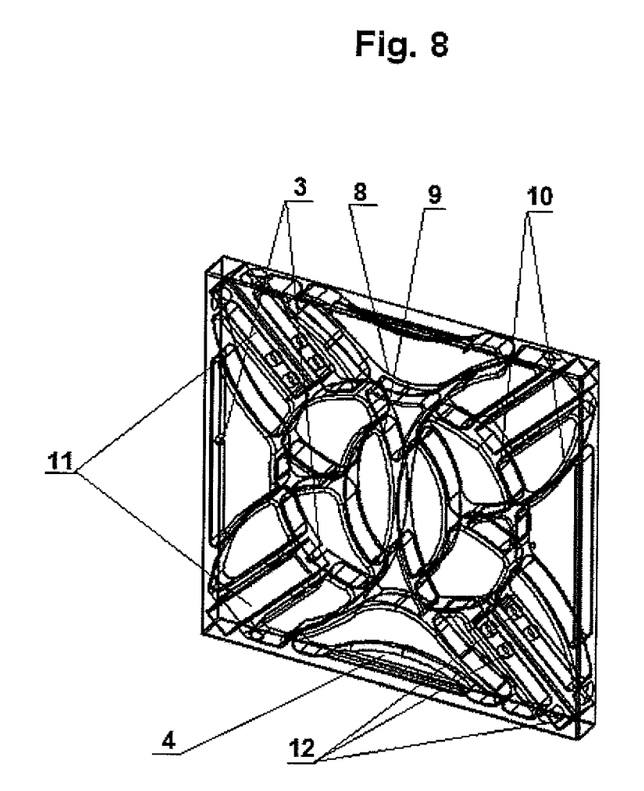
FIG. 8 shows a spatial bottom view of the same plate, before mounting measuring beams.

The following embodiment presents a method of manufacturing a polymeric measuring plate 1 in a variant shown in FIG. 6 to FIG. 8, which consists in shaping the plate body by an injection technology with the use of the above-indicated computer technique, wherein technological holes 12 for mounting tensometric beams or polymeric measuring beams of beam measuring systems 11 are shaped on the passive surface 1b, in channels 10. In such prepared measuring plate 1 ready-made measuring systems 11 are mounted and then the plate 1 is connected to an analyzer not shown in the drawing, calibrated and marked with an unfading code.

The invention claimed is:

1. A measuring plate comprising;
    a substantially flat active surface; and
    a passive surface,
    wherein an entire volume of the substantially flat active surface and an entire volume of the passive surface are integrally formed from a polymeric material,
    wherein the passive surface comprises a plurality of stress concentrators, and
    wherein a measurement system is arranged near the stress concentrators,
    wherein the passive surface comprises;
    a plurality of sockets arranged near the plurality of stress concentrators,
    wherein beam measuring systems are located in the sockets.

2. The measuring plate according to claim 1, wherein the passive surface comprises;
    a plurality of ribs; and
    a plurality of channels.

3. The measuring plate according to claim 1, wherein the measurement system is uniformly bonded with the passive surface.

4. A method of manufacturing a measuring plate comprising:
selecting, by means of computer software specific for working conditions of the measuring plate, a shape of the measuring plate;
forming, by thermosetting or chemically curing, the measuring plate as a single workpiece formed from a polymeric material,
wherein the measuring plate comprises:
a substantially flat active surface; and
a passive surface comprising a plurality of ribs and a plurality of channels formed under the substantially flat active surface; and
bonding, in a uniform manner, an optoelectronic measuring system a layer of extreme fibers of the measuring plate in an area selected by the computer software.

5. The method according to claim 4, further comprising:
forming a plurality of stress concentrators in the passive surface;
forming a plurality of sockets in the passive surface; and
placing tensometric beams or polymeric measuring beams in the plurality of sockets.

6. The method according to claim 4,
wherein a measurement system of the measuring plate is connected by means of signal cables to an analyzer, and
wherein the measuring plate is calibrated and marked with an unfading code.

7. The measuring plate according to claim 1, wherein the polymeric material is a polymeric thermoplastic material.

8. The measuring plate according to claim 1, wherein the polymeric material is a polymeric duroplastic material.

9. The measuring plate according to claim 1, wherein the measurement system is an optoelectronic measurement system, a capacitive measurement system, an inductive measurement system, a polymeric measurement beam system, a tensometric measurement beam measurement system, or an optical fiber grid measurement system.

10. The measuring plate according to claim 9, wherein the measurement system is the capacitive measurement system, and
wherein the capacitive measurement system is located immediately under a bottom of the substantially flat active surface.

11. A method of manufacturing a measuring plate comprising:
selecting, by means of computer software specific for working conditions of the measuring plate, a shape of the measuring plate;
forming, by thermosetting or chemically curing, the measuring plate as a single workpiece formed from a polymeric material,
wherein the measuring plate comprises:
a substantially flat active surface; and
a passive surface comprising a plurality of ribs and a plurality of channels formed under the substantially flat active surface;
forming a plurality of stress concentrators in the passive surface;
forming a plurality of sockets in the passive surface; and
placing tensometric beams or polymeric measuring beams in the plurality of sockets.

* * * * *